(12) United States Patent
Myler

(10) Patent No.: US 8,182,895 B2
(45) Date of Patent: May 22, 2012

(54) PADDED EDGE COVERS

(76) Inventor: Robert L Myler, Mountain Home, AR (US)

(*) Notice: Subject to any disclaimer, the term of this patent is extended or adjusted under 35 U.S.C. 154(b) by 155 days.

(21) Appl. No.: 12/591,551

(22) Filed: Nov. 23, 2009

(65) Prior Publication Data

US 2010/0129596 A1 May 27, 2010

Related U.S. Application Data

(60) Provisional application No. 61/193,379, filed on Nov. 21, 2008.

(51) Int. Cl.
*B32B 3/06* (2006.01)
(52) U.S. Cl. .................. 428/99; 248/345.1
(58) Field of Classification Search .......... 428/99; 248/345.1; 24/625, 697.1, 295, 297
See application file for complete search history.

(56) References Cited

U.S. PATENT DOCUMENTS

| | | | | |
|---|---|---|---|---|
| 2,986,419 | A * | 5/1961 | Barenyi | 293/121 |
| 3,089,276 | A * | 5/1963 | Brooks | 248/345.1 |
| 4,710,992 | A * | 12/1987 | Falwell et al. | 5/663 |
| 4,901,420 | A * | 2/1990 | Keithley, Jr. | 29/417 |
| 7,311,958 | B2 | 12/2007 | Morris | |
| 2002/0012772 | A1 | 1/2002 | Kraemer | |
| 2002/0072455 | A1 | 6/2002 | Akins | |
| 2010/0140966 | A1* | 6/2010 | Kimball | 293/128 |

* cited by examiner

*Primary Examiner* — Alexander Thomas
(74) *Attorney, Agent, or Firm* — Richard C. Litman

(57) ABSTRACT

The padded edge cover has a hemispherical top portion and a cylindrical bottom portion extending from the top portion, the two portions forming a core of cushioning material. Prongs extend from a rear face of the bottom core portion to insert into hollow extruded metal frame members. The padded edge cover is resilient in order to cushion physical contact of personnel with the frame members. The padded edge covers are easily removable from the frame members and can be stored on a metal bracket designed specifically for the covers. Alternative embodiments of the padded edge covers are substantially rectangular and have either prongs or magnetic members to retain the padded covers to the frame members.

8 Claims, 6 Drawing Sheets

PADDED EDGE COVERS

CROSS-REFERENCE TO RELATED APPLICATION

This application claims the benefit of U.S. Provisional Patent Application Ser. No. 61/193,379, filed Nov. 21, 2008.

BACKGROUND OF THE INVENTION

1. Field of the Invention

The present invention relates generally to personnel protection devices, and more particularly to padded edge covers designed to fit onto the end/edges of hollow extruded metal frames, such as auto lift arms, the padded edge covers protecting personnel from impacting on the metal frame edge.

2. Description of the Related Art

It is commonly known and understood that sharp edges on metal frame members pose a risk to personnel working in the vicinity of such frame members. Such exposed edges may also pose a risk to observers, such as customers of auto shop personnel. For example, a customer who gets injured by bumping up against an auto lift frame may sue the shop owner for damages. This is a risk that the auto shop owner may wish to minimize in as practicable a manner as possible.

To reduce the risk posed by sharp frame member edges to shop personnel and their customers, it is desirable to provide some sort of padding over the sharp edges. The art of padded edge covers suffers from deficiencies in terms of aesthetics, reusability, and ability to be easily removed, stored, and cleaned, and therefore has heretofore not been successful.

Thus, padded edge covers solving the aforementioned problems are desired.

SUMMARY OF THE INVENTION

The padded edge covers are cushions designed to fit onto the end/edges of hollow extruded metal frames such as, e.g. the lift arms of an automobile lifting device, to protect personnel from impacting on the metal frame edge. The padded edge covers vary in size and shape in order to fit correspondingly shaped extruded metal frame members. In an exemplary use, the edge covers slip on the edges of the arm members to cover the rough metal edges that often can cause injury to mechanics when the arm is in use. Preferably thermoplastic prongs extend from a rear portion of a padded edge cover, the prongs being insertable into the hollow frame member at its edge. The padded edge covers can be easily removed to prevent them from getting dirty when the lift member is on the floor. A bracket serves as a holder for the padded edge covers when not in use. The bracket can be attached to the lift arm at a place that will not interfere with normal operation of the arm.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
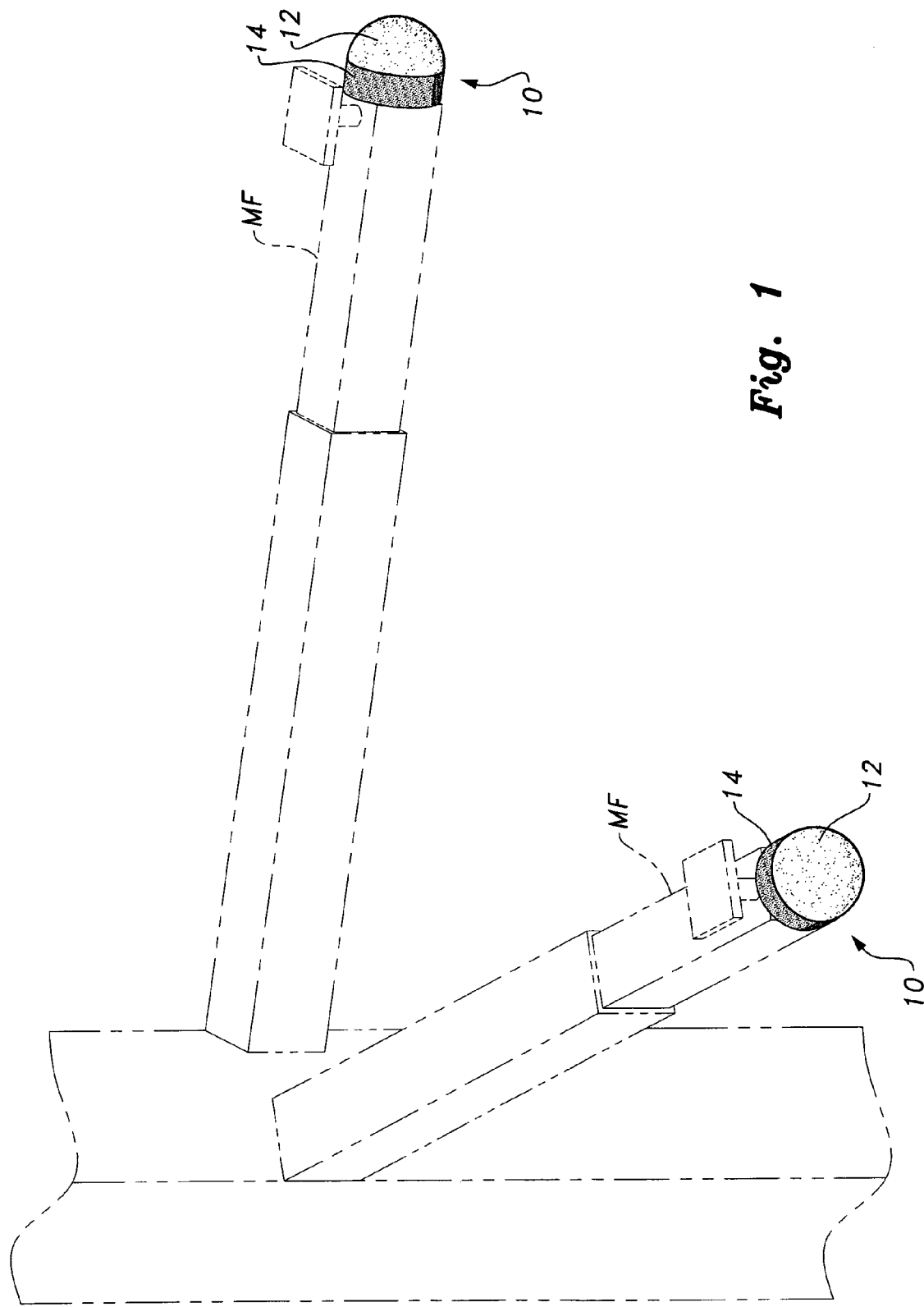
FIG. 1 is an environmental, perspective view of padded edge covers according to the present invention.
Figure 2:
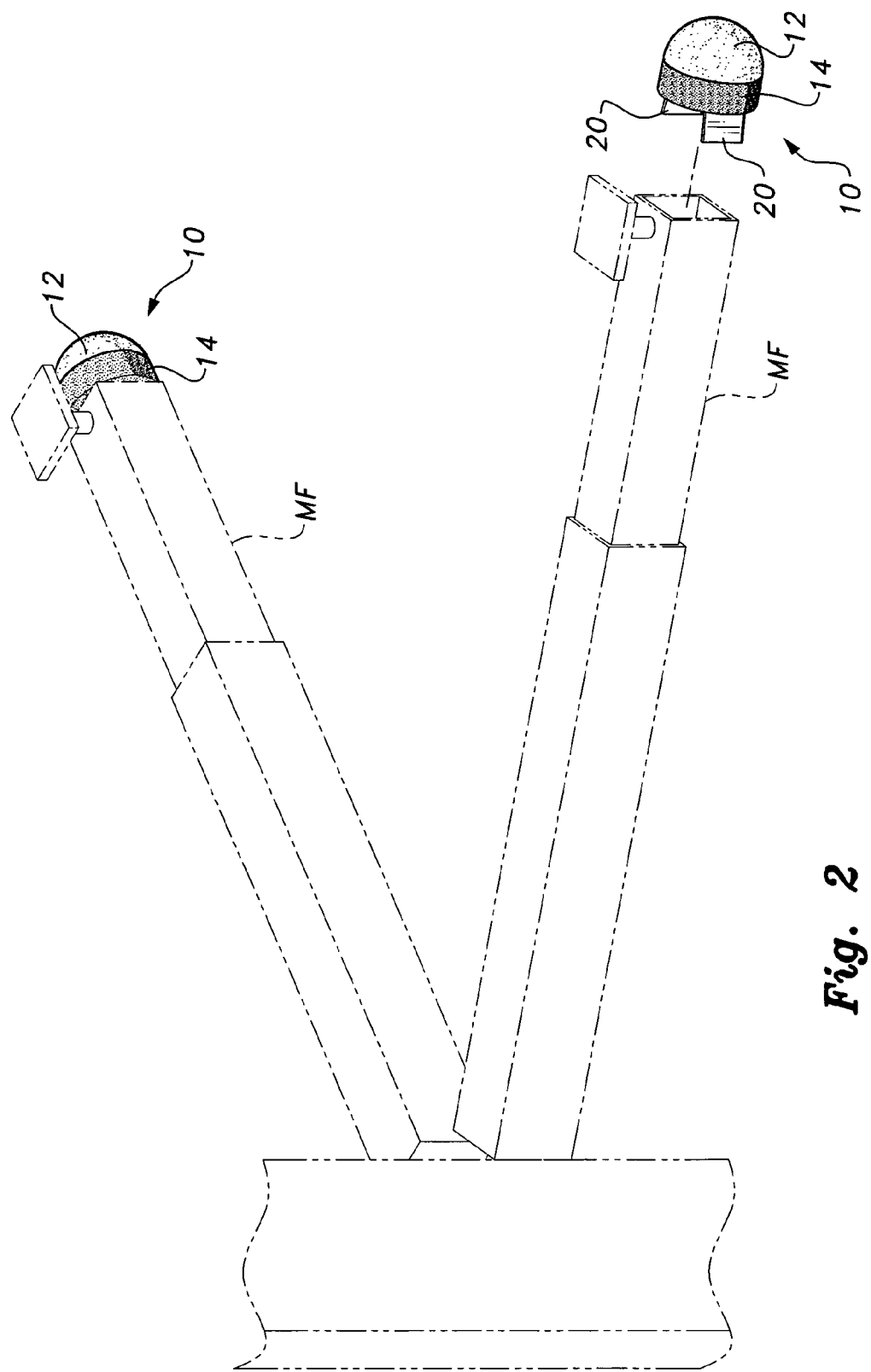
FIG. 2 is a partially exploded, perspective view of a padded edge cover and hollow edged tube according to the present invention.
Figure 3:
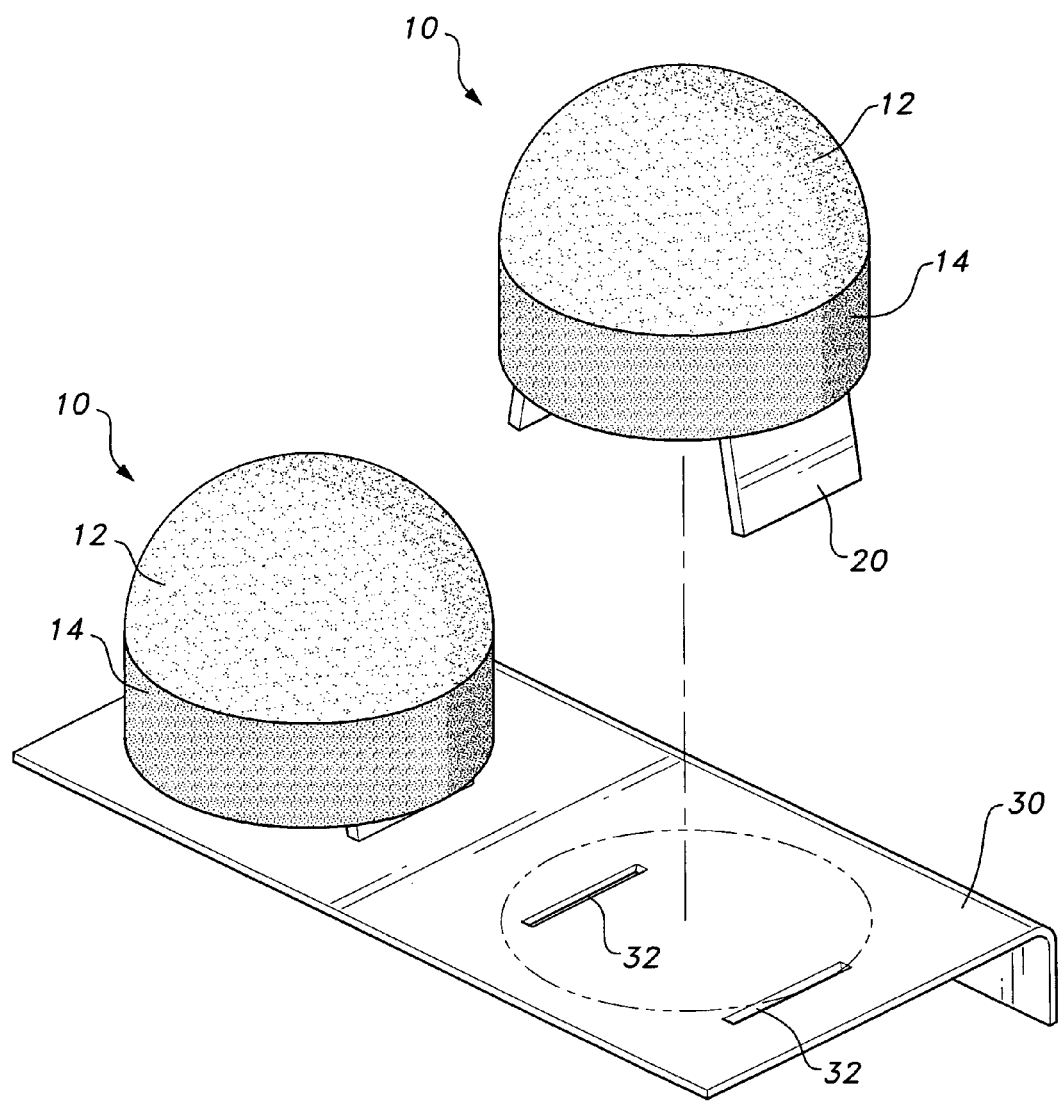
FIG. 3 is an exploded perspective view of the padded edge covers with a holder according to the present invention.
Figure 4:
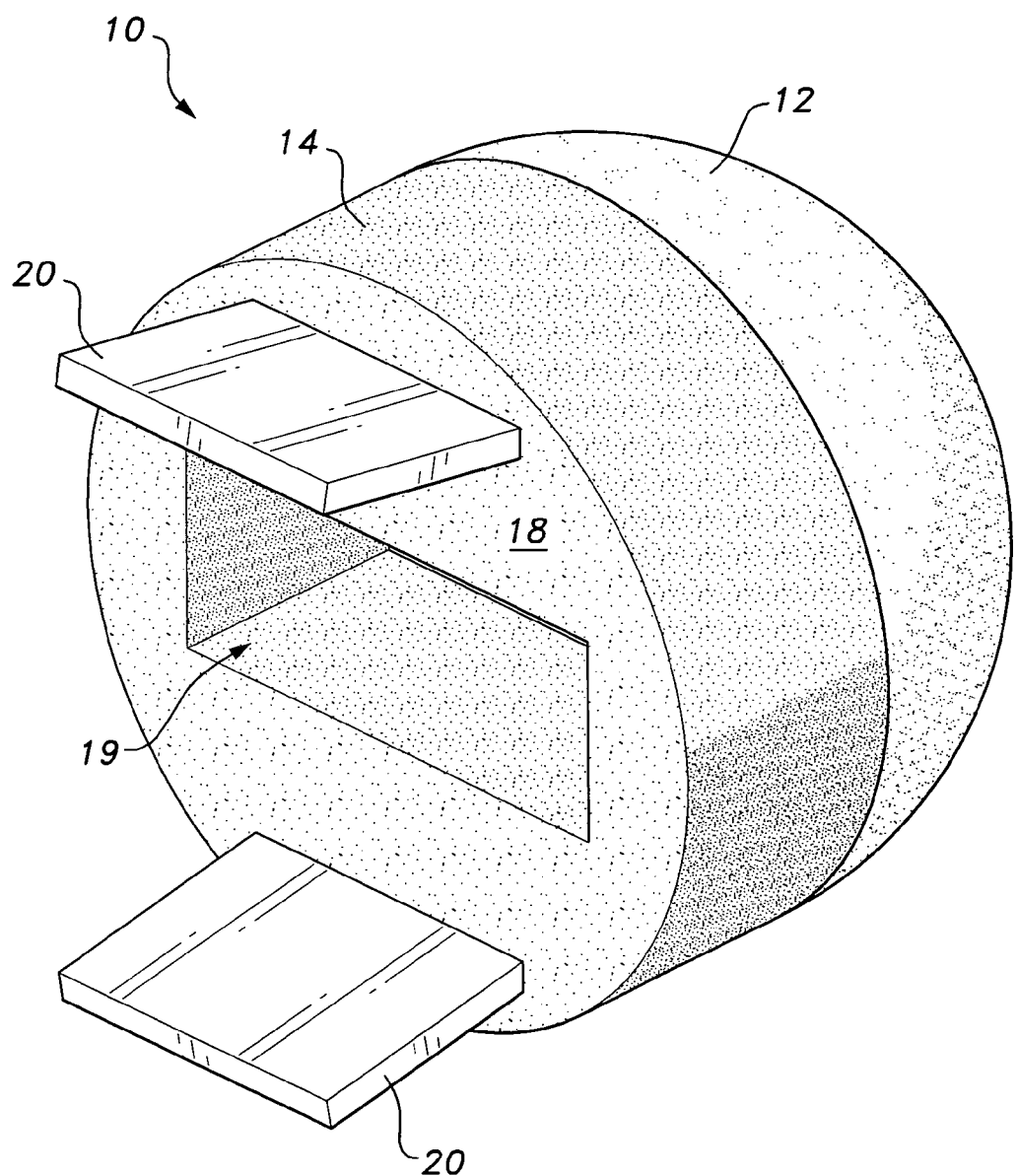
FIG. 4 is a rear perspective view of the padded edge covers according to the present invention.

As shown in FIGS. 1-4, the padded edge covers 10 comprise a hemispherical top portion 12 and a cylindrical bottom portion 14 extending therefrom to form a core of cushioning material. Preferably, the hemispherical top portion 12 and the cylindrical bottom portion 14 are of unitary construction. Prongs 20 extend, preferably at obtuse angles, from a rear face 18 of the bottom core portion 14 to bite interior walls of the hollow extruded metal frame members MF of e.g., an automobile lifting device, or the like, thereby securing the padded covers 10 thereto. In lieu of, or in addition to prongs 20, the rear face may be treated with an adhesive so that the padded covers 10 may be stuck onto metal frame MF. The rear face 18 may also include centered rectangular aperture 19, which can conform to any internal structural elements inside edge of hollow extruded metal frame member MF.

The padded edge cover 10 can be made of a resilient material, e.g., polyethylene foam, polyurethane foam, or the like, in order to provide a cushion for physical contact, e.g., head contact of personnel with the frame members MF. The padded edge covers 10 are easily removable from the frame members MF and can be stored on a bracket 30 designed specifically for the covers 10. The bracket 30 is provided with mounting hardware so that the bracket 30 can be mounted on a surface on an auto-lift, a wall, or the like. The bracket 30 has slots 32 that correspond in positioning to the prongs 20 on padded edge cover 10. A plurality of slots 32 is provided in order to accommodate multiple padded edge covers 10.

Figure 5:
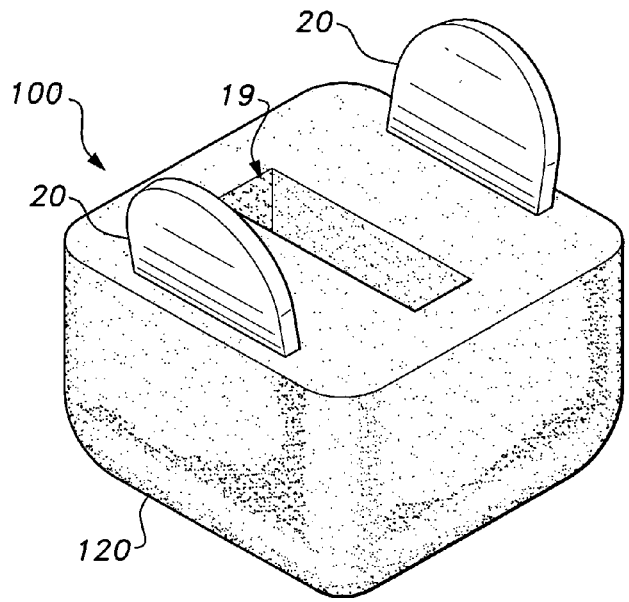
FIG. 5 is a bottom perspective view of an alternative embodiment of the padded edge cover with prongs, according to the present invention.
Figure 6:
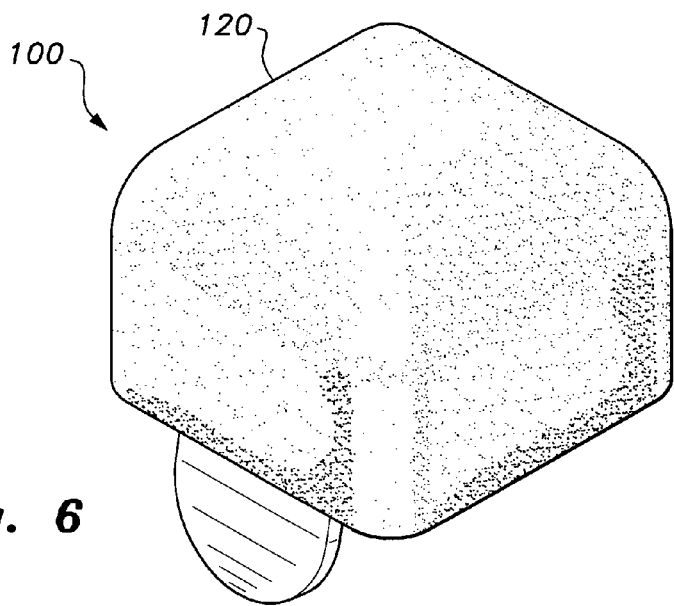
FIG. 6 is a top perspective view of the alternative pronged embodiment of the padded edge cover, according to the present invention.

As shown in FIGS. 5-6, an alternative pad 100 has a rounded, substantially rectangular top outer surface 120, yet retains frame attachment prongs 20, which extend from the bottom portion of pad 100. The prongs 20 resiliently snap into the ends of the hollow frame members of the lifting device, or engage the frame members by friction fit.

Figure 7:
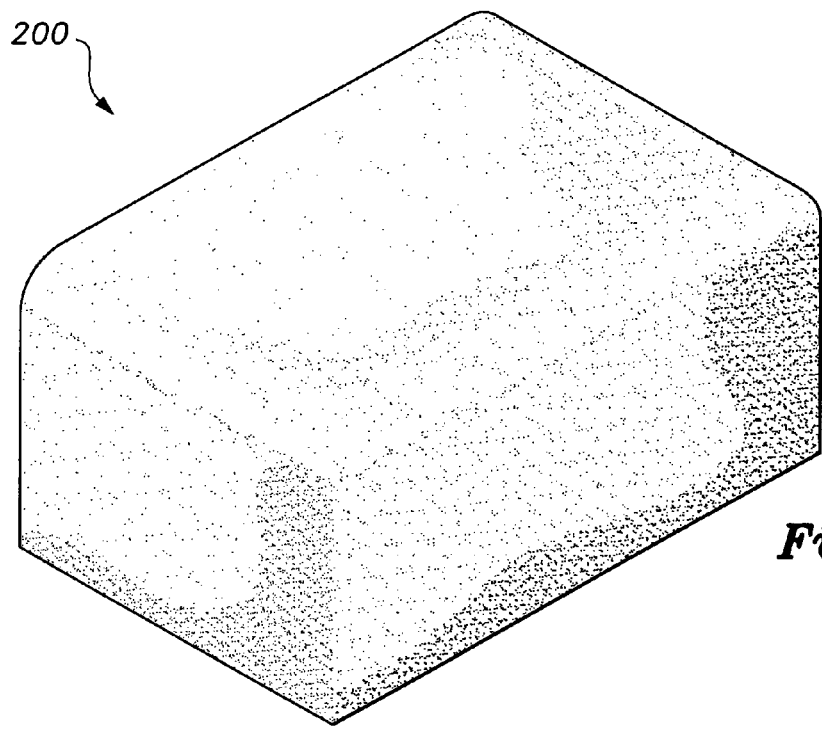
FIG. 7 is a perspective view of a magnetic, prongless padded edge cover, according to the present invention.
Figure 8:
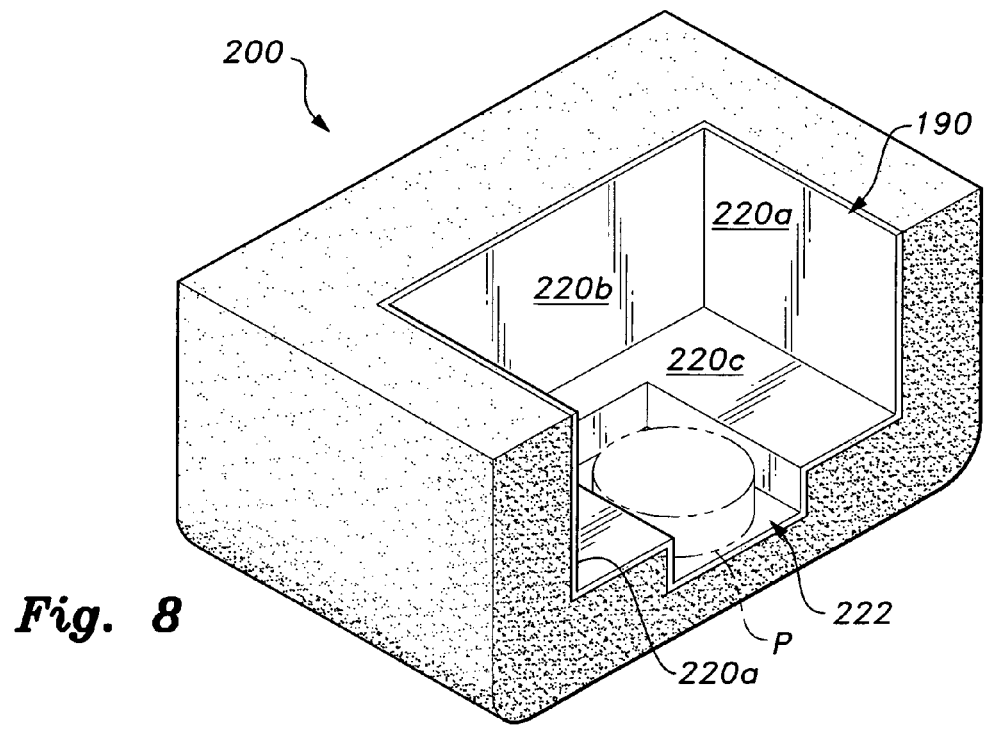
FIG. 8 is a bottom perspective view of the magnetic, prongless padded edge cover, according to the present invention.

As shown in FIGS. 7-8, padded cover 200 has magnetic internal walls 220a, 220b and a magnetic internal floor 220c, which form a large, generally U-shaped recess 190 in the cushioning material forming padded cover 200. The magnetic floor 220c has a U-shaped channel 222 to accommodate structure of an automobile lifting device, such as pin P. The magnetic walls 220a, 220b, and floor 220c can be placed on a protruding end of a lifting device's metal frame member, and magnetically retain the pad 200 on the frame member due to magnetic attraction of the frame member to the magnetic walls 220a, 220b and magnetic floor 220c. Peripheral edges of the pad 200 may be rounded where a person's head might strike the pad.

It is to be understood that the present invention is not limited to the embodiment described above, but encompasses any and all embodiments within the scope of the following claims.

I claim:

1. A padded edge cover adapted for attachment to a frame member edge, comprising:
    a solid body forming a core of resilient, cushioning material, the solid body having a top portion and a bottom portion; and
    a pair of resilient, substantially planar prongs extending outwardly from the bottom portion, wherein the pair of prongs extend in opposite obtusely angled directions with respect to the bottom portion of the body, pair of prongs being adapted for removably attaching the solid body to the frame member edge, wherein the bottom portion of said solid body has an aperture formed therein centered between the prongs adapted for conforming the solid body to any internal structural elements of the frame member.

2. The padded edge cover according to claim 1, wherein said solid body has rounded peripheral edges.

3. The padded edge cover according to claim 1, wherein said solid body comprises a hemispherical top portion and a cylindrical bottom portion extending from the hemispherical top portion, the top and bottom portions together forming a core of resilient, cushioning material.

4. The padded edge cover according to claim 1, wherein said solid body is made from polyethylene foam.

5. The padded edge cover according to claim 1, wherein said solid body is made from polyurethane foam.

6. A padded edge cover adapted for attachment to a frame member edge, comprising:
    a solid body forming a core of resilient, cushioning material, the solid body having a top portion and a bottom portion, wherein the top portion comprises a hemispherical portion and the bottom portion comprises a cylindrical portion extending from the hemispherical top portion, the top and bottom portions together forming a core of resilient, cushioning material; and
    a pair of resilient, substantially planar prongs extending outwardly from the bottom portion, wherein the pair of prongs extend in opposite obtusely angled directions with respect to the bottom portion of the body, pair of prongs being adapted for removably attaching the solid body to the frame member edge.

7. The padded edge cover according to claim 6, wherein said solid body is made from polyethylene foam.

8. The padded edge cover according to claim 6, wherein said solid body is made from polyurethane foam.

* * * * *